3,369,856
DYEING POLYPROPYLENE TEXTILES WITH A
TRIAZOYLAZO-(N,N-SUBSTITUTED) ANILINE
Johannes Dehnert and Walter Grosch, Ludwigshafen
(Rhine), and Herbert Leube, Limburgerhof, Pfalz, Germany, assignors to Badische Anilin- & Soda-Fabrik Aktiengesellschaft, Ludwigshafen (Rhine), Germany
No Drawing. Filed Apr. 15, 1965, Ser. No. 448,233
Claims priority, application Germany, Apr. 20, 1964,
B 76,409
9 Claims. (Cl. 8—42)

ABSTRACT OF THE DISCLOSURE

Process of dyeing an isotactic polypropylene textile material which contains a metal compound capable of forming a chelate complex with an aqueous dispersion of a dye of the formula

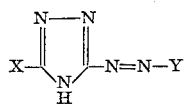

where X is hydrogen, carboxy, alkyl or aryl, Y is a coupling component of a N,N-disubstituted aniline which is free from water-solubilizing groups and from complex-forming groups in ortho-position to the azo group. The resulting dyed products exhibit good fastness properties.

---

This invention relates to a process for the dyeing of polypropylene which contains complex-forming metals.

It is known that polypropylene as a pure hydrocarbon is particularly difficult to dye from an aqueous dye liquor. Since polypropylene does not bear any polar or ionic groups, conventional textile dyes have only slight affinity for textile material of this plastic. It is known that polypropylene fibers can be dyed in medium color strength with suitable lipophilic or disperse dyes which are capable of penetrating into the polypropylene by a kind of dissolving process. Such fat-soluble dyes, which are merely dissolved in the polypropylene, give dyeings however which have very little fastness. In particular, light fastness and resistance to solvents of the dyeings of such dyes on polypropylene textile material are very poor.

It is also known that full dyeings having good fastness properties can be obtained on polypropylene textile material which contains a small amount of a metal compound, particularly an oxide, salt or chelate complex of zinc, aluminum, chromium, cobalt, nickel or iron, by using azo dyes which contain OH groups or o-hydroxy-o'-carboxylic acid groupings in o-position to the azo bridge, or anthraquinone dyes which are capable of forming lakes.

Polypropylene containing metal compounds of the said kind and which is to be dyed may contain the metal compounds as catalyst residues from the production of the polymer. The metal compounds may also be added to the polypropylene to stabilize the polymer against light, against the effects of temperature or oxidizing influences or to improve dyeability. The metal compounds present in the polyolefins are, as already mentioned, organic or inorganic compounds of chromium, nickel, zinc, cobalt, copper or cadmium. These metals belong to the group of transition elements; they are capable of forming compounds of the type of chelate complexes. Compounds of aluminum may also be used. Nickel compounds, e.g. the bis-(paraalkylphenol) monosulfide of nickel, such as are described as stabilizers for polypropylene in U.S. patent specification No. 3,006,885, are also suitable. Inorganic compounds of chromium, such as those described in French patent specification No. 1,142,024, are also effective stabilizers for polypropylene in small amounts. The use of other compounds of the said metals as additives to polypropylene is described in U.S. patent specifications Nos. 2,971,940, 2,980,645 and 2,997,456.

These additives are usually employed in relatively small amounts, for example of about 0.001 to 3% by weight, and in general are added to the polymers during their production. Polypropylene to be dyed should however advantageously contain more than 0.01% by weight, for example 0.01 to 0.5, preferably about 0.1% by weight of the metal.

It is a common feature of the abovementioned azo dyes which contain OH groups or o-hydroxy-o'-carboxylic groups in o-position to the azo bridge, or anthraquinone dyes capable of forming lakes, that, particularly when dyeing on polypropylene which contains nickel compounds, they yield only dyeings in very cloudy shades.

We have now found that textile material, such as fibers, flock, woven fabrics or knitted fabrics of isotactic polypropylene which contains compounds of metal capable of forming chelate complexes can be dyed in bright shades, with or without dyeing assistants, and that dyeings having good fastness properties are obtained by using monoazo dyes having the formula:

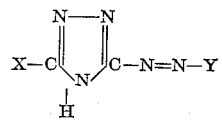   I in which X denotes a hydrogen atom, a carboxy group, an alkyl group or an aryl group and Y denotes the radical of a coupling component of a N,N-disubstituted aniline which is free from water-solubilizing groups and which is free from complex-forming groups in o-position to the azo group.

Y may denote in particular the radical of an N,N'-dialkylaniline whose alkyl groups may be further substituted. The radical Y may bear nonionic substituents, such as alkyl, cycloalkyl, aryl, alkoxy, and acylamino groups or halogen atoms. Examples of substituents or the nitrogen atom of the aniline coupling component are alkyl, hdroxyalkyl, cyanoalkyl, alkoxyalkyl, aryloxyalkyl, acyloxyalkyl, carboalkoxyalkyl, haloalkyl, cycloalkyl, aralkyl or aryl, and these in turn may bear further nonionic substituents.

Compounds which are particularly valuable tinctorially are those having the formula:

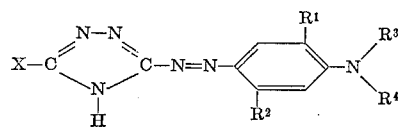   II in which X denotes a hydrogen atom, a carboxy group, an alkyl group having one to four carbon atoms, or a phenyl group, $R^1$ denotes a hydrogen atom or a methoxy group, $R^2$ denotes a hydrogen atom, a chlorine atom, a methoxy group or a methyl group, $R^3$ denotes an alkyl group having one to four carbon atoms, a cyanoethyl group or a benzyl group, and $R^4$ denotes an alkyl group having one to four carbon atoms, an acetoxyethyl group, a hydroxyethyl group or a benzyl group.

The methods conventionally used for dyeing with disperse dyes may be employed for dyeing with the dyes to be used according to this invention. The water-insoluble dyes are used in the form of aqueous dispersions obtained by conventional methods. A state of very fine division of the dye is very desirable from the point of view of a good dye yield.

Dyeing with the dyes to be used according to this invention may be from a long liquor or by impregnation with a short liquor on a padding machine. From a long liquor it is advantageous to dye at 70° to 130° C., preferably at 90° to 130° C. If the material being dyed is impregnated on a padding machine it is possible to use room temperature or slightly elevated temperature and, after the impregnated material has been dried at 70° to 100° C., to heat it for a short time to about 130° C.

It is advantageous to carry out dyeing in the neutral or weakly acid range; adjustment of the pH value of the liquor to 4 to 5 by adding acetic acid increases the dye yield in many cases.

In some cases it is advantageous to add to the dye liquor, in addition to the dispersing agents contained in the dye formulation, other dispersing or emulsifying agents, for example condensation products of naphthalenesulfonic acid and formaldehyde, ethenoxylation products of fatty acids, ethenoxylation products of aliphatic amines or alcohols or polyglycol ethers, also in sufonated form.

Polypropylene textile material may also be printed with the dyes to be used according to this invention. The conventional thickening agents, such as methylcellulose, carob bean flour, industrial gum, alignates or tragacanth, may be used for the production of the print pastes. The print pastes may also contain conventional additives, such as urea or thiourea, and substances which facilitate the application of insoluble dyes to textile fibers, such as thiodiglycol or sulfonated oils.

The printing color is applied to the textile material by conventional methods, for example by film, screen or roller printing. The textile material is then dried and treated either with steam at atmospheric or superatmospheric pressure or with hot air at 110° to 130° C.

The dyed or printed textile material of metal-containing polypropylene may then be given a conventional aftertreatment, such as washing, brightening, decatizing or heat setting.

All thermal treatments should however be carried out below the softening point of the polypropylene.

The invention is further illustrated by the following examples. The parts and percentages specified in the examples are by weight.

*Example 1*

10 parts of a polypropylene yarn containing about 0.12% by weight of nickel in the form of an organic compound is introduced into a dye liquor which contains in 400 parts of water 0.1 part of the coupling product of diazotized 2-amino-1,3,4-triazole-5-carboxylic acid and N-ethyl-N-benzylaniline, advantageously dispersed with 0.5 to 1 part of a condensation product of an aliphatic amine with ethylene oxide.

The dye liquor is heated during the course of fifteen minutes to 100° C. and dyeing continued for ninety minutes at boiling temperature. The yarn is then rinsed and dried. A bright red dyeing having good light fastness and wash fastness is obtained. The wet fastness of the dyeing may be further improved by washing the dyeing for twenty minutes at 60° C. in a washing solution which contains 2 g./l. of Marseilles soap.

*Example 2*

10 parts of a knitted fabric of polypropylene containing aluminum is introduced into a dye liquor which contains 0.2 part of the coupling product of diazotized 2-amino-1,3,4-triazole-5-carboxylic acid and N,N-diethylaniline intimately mixed with 0.5 part of a reaction product of naphthalenesulfonic acid and formaldehyde, 0.3 part of 30% acetic acid and 0.1 part of a product obtained from 1 mole of sperm oil by adding on 80 moles of ethylene oxide and sulfonation, in 500 parts of water. The dye liquor is brought to the boil and dyeing is continued for sixty minutes at boiling temperature. The liquor is cooled and the dyed material is rinsed with hot water and dried. A golden yellow dyeing having good fastness properties is obtained.

*Example 3*

10 parts of a polypropylene cloth containing nickel is introduced into a dye liquor which contains in 400 parts of water 0.1 part of the coupling product of 2-amino-1,3,4-triazole-5-carboxylic acid and N,N-dibutylaniline, dispersed with 0.5 part of the reaction product of naphthalenesulfonic acid with formaldehyde, 0.3 part of 30% acetic acid and 0.1 part of the ethenoxylation product of a neutral oil. The dye liquor is heated to 125° C. in a suitable pressuretight vessel and dyeing is continued for sixty minutes at this temperature with regular mechanical movement of the material being dyed. After the liquor has been cooled, the dyeing is rinsed in warm water and freed from superficially adherent dye by washing in a solution containing 1 part of a fatty alcohol sulfonate in 500 parts of water. A bright red dyeing having very good fastness properties is obtained.

*Example 4*

A padding liquor is prepared containing in 100 parts of water 20 parts of the coupling product from diazotized 2-amino-1,3,4-triazole and N,N-dibutyl-3-methylaniline, 10 parts of a thickening based on industrial gum and 2 parts of a condensation product of naphthalenesulfonic acid with formaldehyde, and a cloth of polypropylene containing nickel is impregnated with this solution, squeezed out and dried at 70° to 100° C. The dye is then fixed either by steaming for ten minutes at 100° C. or by heating the cloth for five minutes at 130° C. The cloth is then rinsed thoroughly. A red dyeing having very good fastness properties is obtained.

*Example 5*

A cloth of polypropylene containing nickel is printed with a print paste having the following composition:

| | Parts |
|---|---|
| Coupling product of 2-amino-1,3,4-triazole and N,N-dibutylaniline | 30 |
| Emulsifying agent | 15 |
| Thiodiglycol | 50 |
| Thickening based on carbo bean flour (1:2) | 500 |
| Print oil | 25 |
| and | |
| Water | 380 |
| | 1000 |

The cloth is then dried and the dye is fixed either by heating the cloth to 130° C. for three to five minutes or by steaming it at 1.3 atmospheres gauge for fifteen minutes. A red print having good general fastness is obtained.

Similarly, by using the following dyes, instead of the dyes enumerated in Examples 1 to 4, for dyeing or printing, dyeings or prints having good fastness properties are obtained.

Diazo component—2-amino-1,3,4-triazole:
    Coupling components—
        N,N-dimethylaniline
        N,N-dibenzylaniline
        N-methyl-N-propylaniline
        N-ethyl-N-benzylaniline
        N,N-dibutyl-2-methoxy-5-chloroaniline
        N-ethyl-N-benzyl-2,5-dimethoxyaniline
        N,N-dibutyl-3-chloroaniline
        N,N-dipropyl-3-methylaniline Diazo component—2-amino-1,3,4-triazole-5-carboxylic acid:
    Coupling components:
        N-ethyl-N-acetoxyethylaniline
        N-ethyl-N-benzylaniline N-cyanoethyl-N-acetoxyethylaniline
N,N-dibutyl-3-chloroaniline Diazo component—2-amino-1,3,4-triazole-5-carboxylic acid:
  Coupling components—
    N,N-dibutyl-3-methylaniline
    N,N-dimethyl-3-methoxyaniline
    N-butyl-N-acetoxyethylaniline
    N,N-dibutyl-2-methoxy-5-chloroaniline
    N-methyl-N-propylaniline
    N,N-dimethylaniline
    N-ethyl-N-hydroxyethylaniline
    N,N-dipropyl-2,5-dimethoxyaniline
    N-butyl-N-cyanoethylaniline Diazo component—2-amino-5-phenyl-1,3,4-triazole:
  Coupling components—
    N,N-dimethylaniline
    N,N-dibutylaniline
    N-ethyl-N-benzylaniline
    N,N-dibutyl-3-chloroaniline
    N-cyanoethyl-N-benzylaniline Diazo component—2-amino-5-ethyl-1,3,4-triazole:
  Coupling components—
    N,N-dibutylaniline
    N-ethyl-N-benzylaniline
    N,N-dibutyl-3-chloroaniline If dyes are used which contain the corresponding 5-methyl, 5-propyl or 5-butyl compounds instead of 2-amino-5-ethyl-1,3,4-triazole as diazo components, dyeings and prints having similar properties are obtained.

We claim:

1. A process for dyeing a textile material of isotactic polypropylene containing a compound of a metal capable of forming chelate complexes, which comprises dyeing said material with an aqueous dispersion of a dye having the formula:

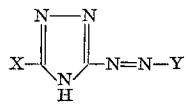

in which:
X denotes a member selected from the class consisting of a hydrogen atom, a carboxy group, an alkyl group and an aryl group and
Y denotes the radical of a coupling component of a N,N-disubstituted aniline which is free from water-solubilizing groups and which is free from complex-forming groups in o-position to the azo group.

2. A process for dyeing a textile material of isotactic polypropylene containing a metal capable of forming chelate complexes which comprises dyeing said material with an aqueous dispersion of a dye having the formula:

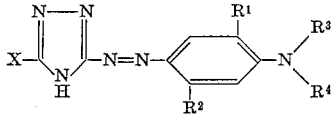

in which
X denotes a member selected from the class consisting of a hydrogen atom, a carboxy group, an alkyl group having 1 to 4 carbon atoms, and a phenyl group,
$R^1$ denotes a member selected from the class consisting of a hydrogen atom and a methoxy group,
$R^2$ denotes a member selected from the class consisting of a hydrogen atom, a chlorine atom, a methoxy group and a methyl group,
$R^3$ denotes a member selected from the class consisting of an alkyl group having 1 to 4 carbon atoms, a cyanoethyl group and a benzyl group,
$R^4$ denotes a member selected from the class consisting of an alkyl group having 1 to 4 carbon atoms, an acetoxy ethyl group, a hydroxyethyl group and a benzyl group.

3. A process as claimed in claim 1 wherein the isotactic polypropylene contains 0.01 to 0.5% by weight of nickel.

4. A process as claimed in claim 2 wherein said isotactic polypropylene containing 0.01 to 0.5% by weight of nickel is dyed with an aqueous dispersion of the dye having the formula:

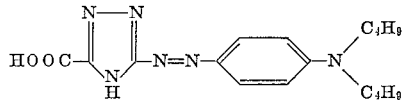

5. A process as claimed in claim 2 wherein said isotactic polypropylene containing 0.01 to 0.5% by weight of nickel is dyed with an aqueous dispersion of the dye having the formula:

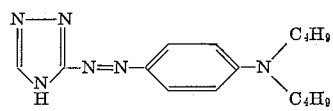

6. A process as claimed in claim 2 wherein said isotactic polypropylene containing 0.01 to 0.5% by weight of nickel is dyed with an aqueous dispersion of the dye having the formula:

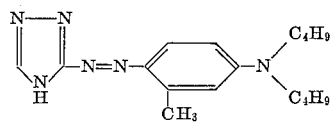

7. A process as claimed in claim 2 wherein said isotactic polypropylene containing 0.01 to 0.5% by weight of nickel is dyed with an aqueous dispersion of the dye having the formula:

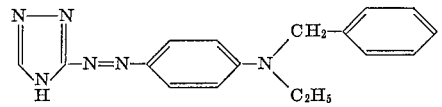

8. A process as claimed in claim 2 wherein said isotactic polypropylene containing 0.01 to 0.5% by weight of nickel is dyed with an aqueous dispersion of the dye having the formula:

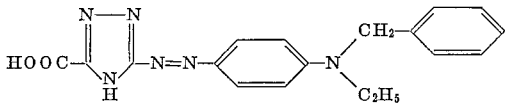

9. The dyed textile material obtained by the process of claim 2.

References Cited

UNITED STATES PATENTS 2,308,023   1/1943   Peterson _____ 260—157 X

FOREIGN PATENTS 642,346   5/1964   Belgium.

J. TRAVIS BROWN, *Acting Examiner.*

DONALD LEVY, *Primary Examiner.*

UNITED STATES PATENT OFFICE
CERTIFICATE OF CORRECTION

Patent No. 3,369,856                      February 20, 1968

Johannes Dehnert et al.

It is certified that error appears in the above identified patent and that said Letters Patent are hereby corrected as shown below:

Column 2, line 42, after "substituents", "or" should read -- on --.

Signed and sealed this 16th day of December 1969.

(SEAL)
Attest:

Edward M. Fletcher, Jr.                      WILLIAM E. SCHUYLER, JR.
Attesting Officer                              Commissioner of Patents